United States Patent [19]

Gibbon

[11] Patent Number: 5,369,257
[45] Date of Patent: Nov. 29, 1994

[54] WINDSHIELD DE-ICING AND DEFROSTING MITT USING MICROWAVE ENERGY HEATING AND METHOD

[75] Inventor: Robert M. Gibbon, Fort Worth, Tex.

[73] Assignee: JMK International, Inc., Fort Worth, Tex.

[21] Appl. No.: 89,202

[22] Filed: Jul. 8, 1993

[51] Int. Cl.⁵ .............................. H05B 6/80
[52] U.S. Cl. .................. 219/759; 219/720; 219/203; 15/227; 2/158
[58] Field of Search ............... 219/10.55 F, 10.55 R, 219/10.55 M, 759, 730, 203, 720; 15/227; 2/158, 159, 167

[56] References Cited

U.S. PATENT DOCUMENTS

| | | | |
|---|---|---|---|
| 4,849,593 | 7/1989 | Hughes et al. | 219/10.55 F |
| 4,914,717 | 4/1990 | Gibbon | 219/10.55 |
| 4,931,608 | 6/1990 | Bills | 219/10.55 F |
| 4,933,525 | 6/1990 | St. Philips | 219/720 |
| 4,983,798 | 1/1991 | Eckler et al. | 219/10.55 M |
| 5,029,662 | 7/1991 | Pena | 219/203 |
| 5,050,596 | 9/1991 | Walasek et al. | 2/158 |
| 5,070,223 | 12/1991 | Colasante | 219/10.55 M |
| 5,094,238 | 3/1992 | Gibbon | 128/403 |

*Primary Examiner*—Philip H. Leung
*Attorney, Agent, or Firm*—Jefferson Perkins

[57] ABSTRACT

Apparatus (10, 50) for removing frozen water from vehicle glass includes a cured, microwave-heatable layer (14, 64). The microwave-heatable layer (14, 64) may be formed from at least one elastomeric gum, a curing catalyst adaptable to cure the gum, and microwave-heatable particulate matter dispersed in the gum. In one embodiment, the apparatus (10) is a mitt including an insulative layer (42) which is positioned to be interposed between an inner surface (27) of the elastomeric pad (14) and the hand, such that the hand does not undergo temperature stress. The mitt (10) also preferably includes a visual marker (30) to indicate the temperature of the elastomeric pad (14).

20 Claims, 2 Drawing Sheets

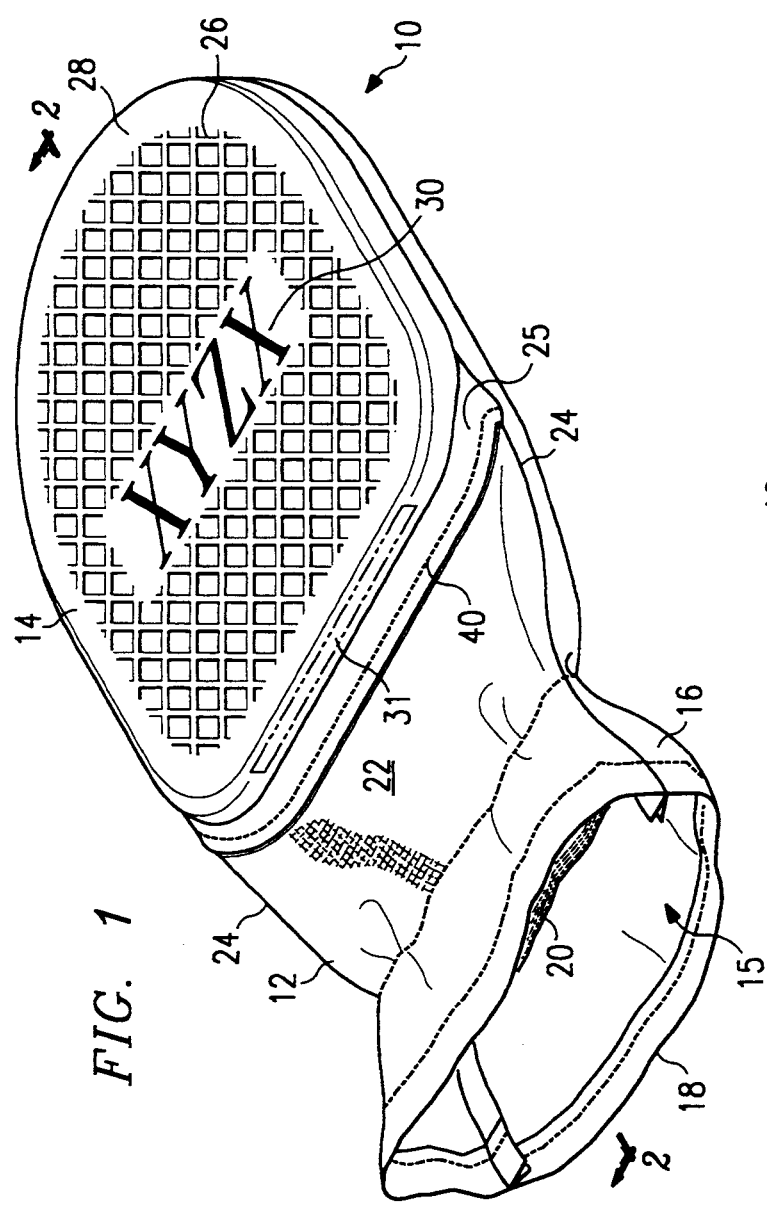
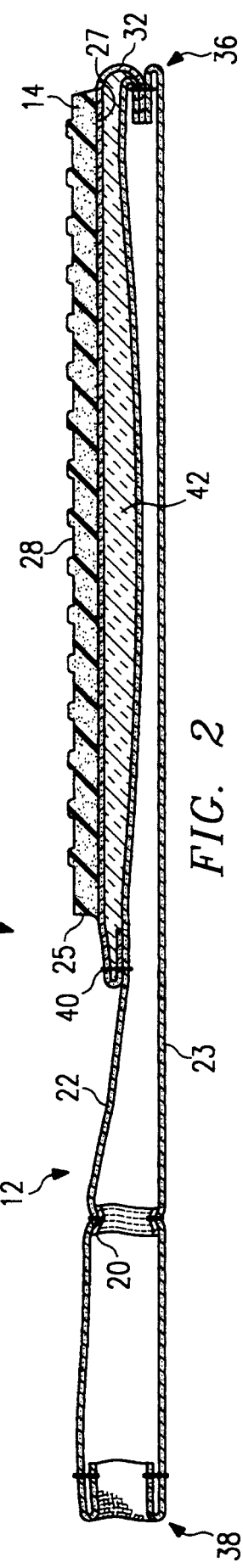

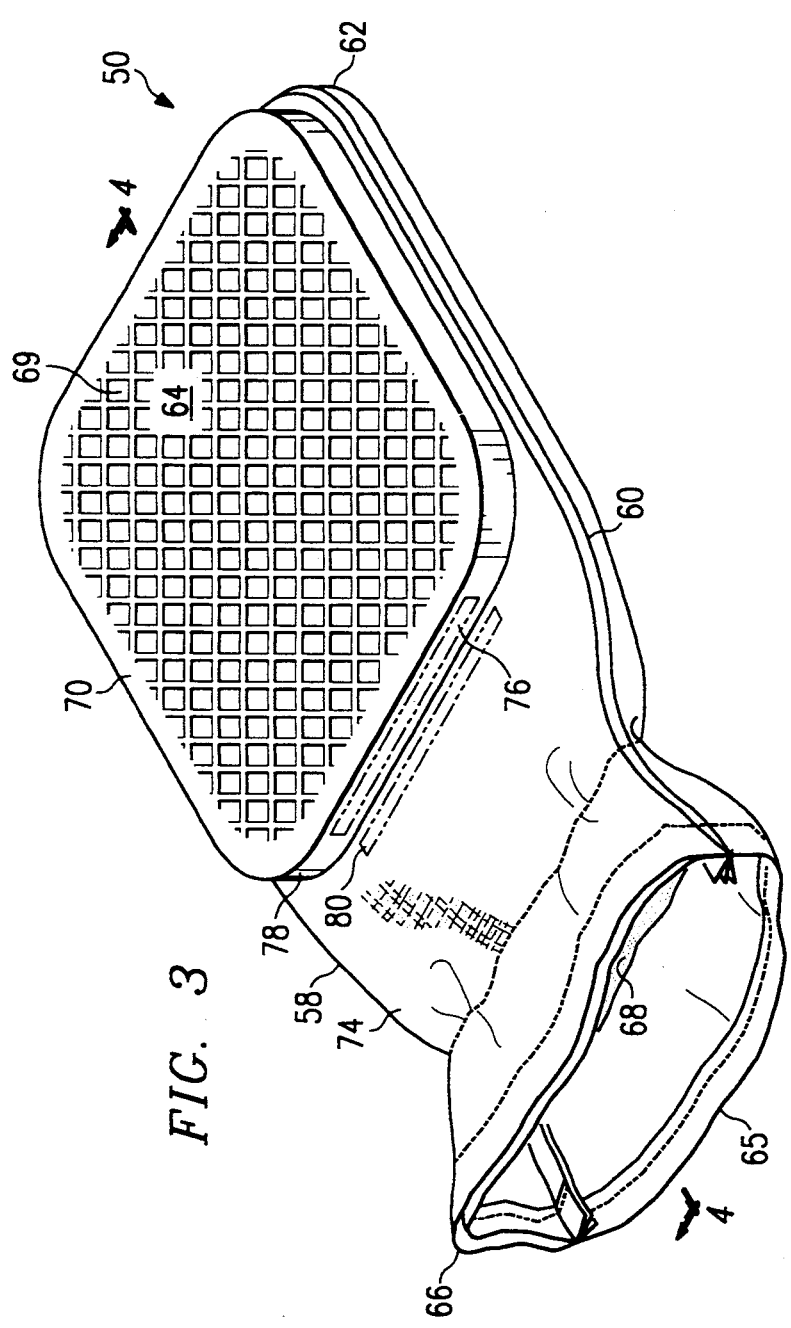
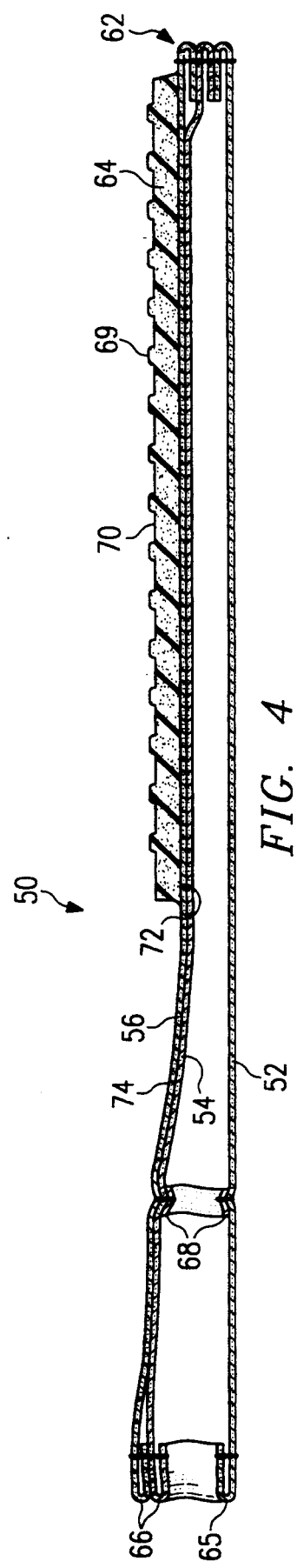

WINDSHIELD DE-ICING AND DEFROSTING MITT USING MICROWAVE ENERGY HEATING AND METHOD

TECHNICAL FIELD OF THE INVENTION

The present invention relates generally to methods and apparatus for the defrosting and de-icing of vehicle windshields and glass, and more particularly relates to a method and apparatus for defrosting or de-icing a vehicle windshield or window using a microwave-hearable device.

BACKGROUND OF THE INVENTION

As long as there have been windshields on automobiles, trucks, airplanes and the like, there has been the problem of removing frozen water, such as frost, snow, ice, sleet, et cetera from the exterior (and sometimes the interior) surfaces of the glass or other transparent windshields and windows of vehicles in climates where freezing temperatures are common. To accomplish this purpose, various scrapers and brushes have long been employed. Also very old in the art is the concept of having electrical heating elements built into the vehicle glass in order to remove frost and the like. A further method is the application of hot air to the interior surfaces of the vehicle window or windshield to melt the frozen water deposit on the exterior surface thereof. These prior art methods of frozen water removal can be generally placed into two classes: melting and abrasion.

While the above prior art methods eventually accomplish their objectives, problems remain with each of them. Under certain conditions, ice or partially melted snow has an amazingly good adherence to vehicle windshields end is only removed by scraping with considerable effort. Electrical heaters and hot air blowers may be ineffective in removing a large deposit of frozen water within an acceptable period of time. Further, electrical heaters and blowers typically require the engine to be turned on; electrical heaters and blowers produce a drain on the battery, and electrical blowers typically require the engine to have already reached a warm operating temperature, thereby consuming gasoline. Of course, chipping away at an ice deposit with a scraper or the like subjects the user to a prolonged period of time in weather which is less than ideal. Therefore, a need continues to exist for improved methods and apparatus used in de-icing or defrosting automobile windshields and windows.

SUMMARY OF THE INVENTION

According to one aspect of the invention, apparatus is provided for removing frozen water from vehicle windshields and windows. The apparatus includes a cured, elastomeric microwave-heatable layer which includes, prior to cure, at least one elastomeric gum, a curing catalyst adaptable to cure the gum to form a matrix and microwave-heatable particulate matter dispersed in the matrix. The apparatus further includes a mitt, handle or other means affixed to the microwave-heatable layer to control the apparatus by the hand. Where the apparatus takes the form of a mitt, an insulated layer or the like is provided to insulate the hand from the microwave-heatable layer, which therefore can be quite hot when it is ready to be applied to the windshield.

In operation, the apparatus is placed within a conventional kitchen microwave oven as is found in an expanding and large percentage of households in the country. The elastomeric layer is heated by the microwave oven to a relatively high temperature, such as 170° F., which is chosen to be sufficiently hot that it delivers a good melting effect to the surface on which it is applied, but yet not too hot that it represents an undue danger to the user. The apparatus is then removed from the microwave oven and applied to a vehicle windshield or the like. Sufficient heat is stored within the elastomeric layer to deliver a significant amount of heat to the ice, snow or frost, causing it to melt.

According to another aspect of the invention, a temperature-sensitive visual marker is affixed to the apparatus. The visual marker has a first visual appearance at an elevated temperature, and a second visual appearance at a second, lower temperature which is distinct from the first visual appearance. This visual marker may take the form of, for example, a paint which is applied to the elastomeric layer. The paint includes a colorant which has a first color at the first, high temperature, and a second color at the second, low temperature. When the apparatus is heated in the microwave oven, the marker takes on the first color or visual appearance. As the elastomeric layer cools toward ambient, the temperature of the marker drops until the second predetermined temperature is reached, at which point the marker will have a second visual appearance. In this manner, the user can tell when the apparatus has cooled off and requires recharging to a high temperature.

The apparatus confers a principal technical advantage in that microwave heating techniques can be used to melt snow, ice or frost off of windshields and vehicle windows. As is known, microwave ovens take a small fraction of the time to heat microwave-reactive substances to the same temperature as radiant or convective ovens or heating elements. The apparatus can be heated in a microwave oven to a useful temperature in a relatively small period of time, and then applied to an automobile windshield. Thus, automobile windshield, window and other transparent surfaces can be cleared without the necessity of warming up the automobile engine and without producing a drain on the battery.

BRIEF DESCRIPTION OF THE DRAWINGS

Other aspects of the invention and their advantages will be apparent by reading the following detailed description, when taken in conjunction with the appended drawings, in which like characters denote like components and in which:

FIG. 1 is an isometric view of a windshield de-icing and defrosting mitt according to one embodiment of the invention;

FIG. 2 is a schematic cross-sectional view taken substantially along line 2—2 of FIG. 1:

FIG. 3 is an isometric view of a windshield de-icing and defrosting mitt according to a second embodiment of the invention; and FIG. 4 is a schematic cross-sectional view taken substantially along line 4—4 of FIG. 3.

DETAILED DESCRIPTION OF THE DRAWINGS

Mitt Structure

Referring first to FIG. 1, a defrosting and de-icing mitt is indicated generally at 10. The mitt 10 includes a cloth or fabric body 12 and an elastomeric layer or pad 14 which is adhered, bonded or otherwise joined to the cloth body 12. The composition of the elastomeric pad 14 will be discussed in detail below.

The mitt 10 in the illustrated embodiment completely encloses the hand, for which a cavity indicated at 15 is formed. A cuff 16 may be formed at one margin 18 of the fabric body 12, as by means of an elastic band 20. The fabric body 12 may be assembled using two matching halves 22 and 23 (see FIG. 2), which halves are stitched along all of their lateral margins 24 (except the bottom margin 18). The cloth body 12 may be formed of a material such as polyester, or may be formed of one or more materials creating a moisture barrier such that, when in use, the hand will not become wet. The fabric body 12 may be treated, as by spraying or impregnation, by any of a number of silicone-based or other water repellants. One such repellant is manufactured by Minnesota Mining and Manufacturing Corporation under the mark SCOTCHGARD. While a thumbless mitt 10 is illustrated in FIG. 1, the mitt 10 may easily be modified to have a thumb if desired.

In the embodiment illustrated in FIGS. 1 and 2, an interior surface 27 of the pad 14 is attached or bonded to a third fabric layer 25 which is then joined as by stitching to the remainder of the cloth body 12. The pad 14 preferably has a two-dimensional area or extent which is at least as large as the palm and fingers of the hand. In a direction parallel to the breadth of the hand, the fabric body 12 preferably is at least as wide as the pad 14 so as to afford room for the hand therein. The pad 14 may have a tread pattern 26 stamped into or otherwise formed on its outer surface 28. Alternatively, where maximum surface area to be applied to the snow or ice is desired, the outer surface 28 of the pad 14 may be smooth. The tread 26 is provided in order to give the pad 14 somewhat of an abrasive characteristic which may aid in the removal of snow, frost or ice.

The mitt 10 preferably includes a visual marker 30 that is in some manner put in close temperature contact with the pad 14. In the embodiment illustrated in FIGS. 1 and 2, the visual marker 30 takes the form of characters or another design which is painted onto the outer pad surface 28. The marker may also appear on a side face of the pad 14, as shown by the dashed rectangle 31.

In a preferred embodiment, the visual marker 30 consists of a series of characters which become visually apparent when the elastomeric pad 14 cools down to a temperature at which its utility as a de-icer or defroster is significantly diminished. Such a temperature may be, for example, 70° F. However, immediately after coming out of the microwave oven, the visual marker 30 will be clear (i.e., colorless and transparent) and will not be readily apparent to the user, as the marker 30 will take on the color of the underlying surface 28. Thus, the user will quickly notice the difference in visual appearance between the pad at a first, operative, high temperature and at a second, inoperative, low temperature. The user then knows it is time to recharge the mitt 10 in a microwave oven to a high temperature, at which time the marker 30 will reassume the visual appearance which it had when heated previously. In a particularly preferred embodiment, the visual marker 30 may be red at a cool temperature (70° F.) and clear at a high temperature (150°), although other colors and combinations could easily be selected. A red color contrasts well with the preferably black general exterior surface 28 of pad 14. In an alternative embodiment, for example, the visual marker may take the form of a colored area which does not change with temperature, adjacent to or surrounding a colored area which does change with temperature. In yet another embodiment, the color of the visual marker 30 may only be apparent when the elastomeric pad 14 is at a first, operative temperature, and may fade to a clear condition or to another color at a second, significantly cooler temperature. The temperature at which the visual appearance of the marker 30 changes should be selected so as to be useful in the temperature range experienced by the mitt 10 during operation. That is, the visual appearance at a first, hot temperature, as the apparatus 10 will have when it comes out of the microwave oven, should be significantly different from a second appearance of the visual marker 30 after it has cooled to 70° F. or even 32° F.

The fabric body 12 should be constructed of a material which is nonabsorptive of microwave energy, i.e., of a material which does not heat up when placed under microwave radiation. One of the objects of the invention is to provide a hot pad 14 in an otherwise cool device, such that the user may readily handle the apparatus 10 without discomfort from the heat. Thus, a significant difference in the microwave heating characteristics of the pad 14 and the fabric body 12 should exist.

Turning now to FIG. 2, a cross-sectional view is shown which is taken substantially line 2—2 of FIG. 1. The fabric body 12 includes a layer 22 of treated polyester or the like that is comfortable to the hand. A top end indicated generally at 36 and a bottom end indicated generally at 38 are created by stitch lines. Preferably, the various layers are folded over near their margins and then stitched. A second stitch line 40 attaches the fabric bonding layer 25 to the polyester cloth layer 22.

In FIG. 2, an insulative layer 42 is disposed between the layer 22 of mitt 10 and tile bonding or carrier fabric layer 25. Insulative layer 42 is relatively thick and should be made of a highly heat-insulative material such as fiberfill or the like. Like layers 22, 23 and 25, the insulative layer 42 should be nonabsorptive of microwave energy.

The insulative layer 42 should at least be coextensive with the two-dimensional extent of the microwave-heatable pad 14. In an alternative embodiment (not shown), tile insulative layer 42 can be continued around the entirety of tile hand to give the hand insulation from the cold while the user is applying the mitt to a vehicle windshield or window surface in a cold environment. It is also possible to have a relatively thin insulative layer (not shown) to insulate the remainder of the hand, and a relatively thicker portion 42 immediately underneath the pad 14.

To provide a large heat reservoir, it is preferred that the pad 14 be at least ¼" thick; the thicker the pad, the more heat can be retained. Upper constraints on thickness include a weight at which the mitt 10 becomes difficult to use, and the time which a conventional microwave needs to heat the pad 14.

FIG. 3 is an isometric view of a mitt indicated generally at 50 according to a second embodiment of the invention. FIG. 4 is a schematic cross-sectional view of FIG. 3 taken substantially along line 4—4 thereof. The construction of the mitt 50 is simplified in comparison with the construction of mitt 10. Three waterproofed polyester layers 52, 54 and 56 are cut out to be of a similar shape and are stitched together along their side margins 58 and 60 and their top margins 62, with the physical margins of the fabric layers 52–56 being folded over before stitching. A bottom margin 64 of the lower fabric layer 52 is stitched by itself, while bottom margins 66 of the layers 54 and 56 are stitched together to make a double layer of fabric. If desired, an elastic band 68 may be stitched or bonded to layers 52 and 54 to form a cuff, as before. The shape of fabric layers 56, 54 and 52 is made larger at end 62 thereof to create a relatively large rectangular space for the mounting of an elastomeric pad 64. This elastomeric pad may be similar in composition to the elastomeric pad 14 shown in FIGS. 1 and 2. The composition of pad 64 will be discussed in detail immediately below. As formulated from a silicone polymer gum, for example, the pad 64 may be extruded as a strip of uncured material which is five to six inches wide and at least ⅓of an inch thick. A tread 69 may be applied to an outer surface 70 of the pad 64, if desired. The tread 69 may be applied as by means of a die which may later be slightly softened or blurred by subsequent processing steps, or may be replaced with a plurality of parallel ridges or grooves made at the time the pad is extruded. The extruded silicone polymer strip is then cut into a rectangular shape; if desired, the corners may be more or less rounded or cut off, as shown. The rectangular shape of the pad 64 shown in FIGS. 3 and 4 is designed to produce a minimum waste of elastomeric material.

The inner surface 72 of the pad 64 may then be pressure-bonded into upper fabric layer 56 to thereby firmly affix the pad 64 to the cloth or fabric body 74 of the mitt 50. The entire mitt 50 may then be submitted to a hot air tunnel to cure the elastomeric pad 64 in situ. The steps for constructing mitt 10 in FIGS. 1 and 2 are in general similar.

The embodiment shown in FIGS. 3 and 4 shows two alternative placements of the visual marker, indicated in FIGS. 3 and 4 by characters 76 and 80. In one embodiment, the visual marker 76 is applied to the side 78 of the pad 64, such that the marker 76 does not come into abrasive contact with the snow or ice. Visual marker 76 may take the form of a stripe of paint or, as above disclosed, a set of characters. In yet another embodiment, the visual marker may be placed on the surface 74 of upper polyester layer 56, as is indicated by the dashed rectangle at 80, in a position adjacent the pad 64.

In an another embodiment, the mitt shown in FIGS. 1 and 2 may be replaced by an elastomeric pad 14 as connected to a non-microwave absorptive handle (not shown) that is sufficiently short that it may be placed in its entirety inside of a conventional microwave oven cavity. This will allow the user more reach over windshields of relatively large vehicles. Other nonillustrated embodiments include one with a hand strap attached to the elastomeric pad instead of a complete mitt, which may be placed over a conventional mitten or glove. Where a handle embodiment is used, the handle preferably is connected to the elastomeric pad 14 in a distributed manner as is found in windshield wiper art, such that the elastomeric pad 14 will conform to the usually curved surface of the automobile windshield, thereby increasing the delivery of melting heat to the ice or snow. The handle acts to provide a handgrip while at the same time spacing (and therefore insulating) the hand from the pad 14.

Pad Composition

The heating pad 14 or 64 comprises at least one layer of a matrix material having blended therein a microwave absorptive material to produce a homogeneous matrix composition which is heatable by exposure to microwave energy. The matrix material can comprise any of a number of commercially available flexible, elastomeric materials. For instance, the matrix material can be, e.g., natural rubber, synthetic rubber, styrene butadiene rubber, ethylene propylene rubber, chloroprene, nitrile rubber and silicone rubber. The criteria for selecting a candidate material are its flexibility after curing to allow application to a curved surface of a vehicle windshield or window, its heat stability, and the ability to be heat actuated by exposure to electromagnetic energy. The preferred material is silicone rubber because of its heat stability and its superior resistance to embrittlement due to oxidation, ozone attack and general use.

The preferred matrix material for the microwaveable layer 14 or 64 can be manufactured by blending together a polydiorganosiloxane gum with a particulate microwave absorptive material to produce a homogeneous, silicone rubber composition which is heatable by exposure to microwave energy. The polydiorganosiloxane polymers or gums employed in the preferred matrices of the invention are well known materials and can be made by standard methods known in the art. The preferred polymer is a polydiorganosiloxane gum which contains methyl, vinyl, phenyl and/or 3,3,3-trifluoropropyl radicals attached to the silicon atoms of the polymeric siloxane. Example of polydiorganosiloxane gums are those polymers, copolymers and mixtures thereof wherein the siloxy units can be dimethylsiloxy, phenylmethylsiloxy, 3,3,3-trifluoropropylmethyl siloxy, diphenylsiloxy, methylvinylsiloxy, and phenylvinylsiloxy. A discussion of the preparation of such compounds can be found, for example, in: Eaborn, D., "Organo Silicone Compounds", Academic Press, New York, 1959; Montermoso, J. C., "Silicone Rubbers", Morton, E. D., "Introduction to Rubber Technology", Reinhold Publishing Corp., New York, 1959; Rochow, E. G., "An Introduction to the Chemistry of Silicone", Ed. John Wiley and Sons, New York, 1951.

The polydiorganosiloxane polymer used in the invention is most preferably a dimethylvinylsiloxy-ended polydiorganosiloxane having, as a percentage of all organic radicals in the gum, about 99.80 percent by weight methyl radicals and about 0.2 percent by weight vinyl radicals. The vinyl percentage may be derived by using a single long-chain polymer with this percentage vinyl level, or alternatively by using a blend of polydimethylsiloxane and methyl vinyl polydiorganosiloxane. A preferred polymer gum has a Williams Plasticity of 120 to 170 mm.

In order to provide a matrix composition which is microwave heatable, a particulate, electromagnetic absorptive material is blended with the matrix material. A number of such materials are commercially available, including carbon ferrites, powdered iron, powdered aluminum, and zinc oxide. The preferred absorptive material is carbon and when blended in the range from about 1 to 30 parts per 100 parts polydiorganosiloxane gum produces a silicone rubber blend which is heatable in the range of 140°–160° F. by exposure to microwave radiation in a 700 watt microwave oven for 15 seconds to 5 minutes, depending on the size and thickness of the pad 14 or 64. A preferred exposure period is 15 to 45 seconds, which is attainable by compositions including elemental carbon because of its relatively high level of microwave reactivity.

The polydiorganosiloxane gum can contain any one or more of a plurality of filler materials which are commercially available from a number of sources. The preferred material is a reinforcing silica filler, or a mixture of reinforcing silica filler and an extending filler. Examples of reinforcing silica filler which can be used to reinforce the organopolysiloxane elastomer are fumed silica, precipitated silica and silica aerogel. The filler material, including reinforcing and non-reinforcing fillers, is preferably used in the range of about 10–260 parts of filler per 100 parts of polydiorganosiloxane gum or elastomer, most preferably in the range of about 20 to 80 parts by weight of filler.

Various curing agents can be employed to effect the more rapid conversion of the polydiorganosiloxane compositions to the cured, solid elastic state, for example, benzoyl peroxide, bis (2,4-dichlorobenzyl) peroxide, and the like. These curing agents are normally present in the polydiorganosiloxane composition in an amount ranging from about 0.1 to as high as 4 to 8 parts or more based on 100 parts of the polydiorganosiloxane blend.

In addition to the above described ingredients, the silicone rubber matrix compositions of the invention can contain heat stability additives, compression set additives, additives to improve handling properties, dyes or coloring additives and other additives conventionally used in heat cured silicone elastomers and also room temperature cured elastomers.

The preferred microwaveable silicone rubber matrix composition is made by blending or milling together the various constituents. The order of adding the elastomer, filler, curing agent, and electromagnetic absorptive material is not critical. The following example is intended to be illustrative of the invention:

| | |
|---|---|
| Polydiorganosiloxane Gum: | 60.0 |
| Zinc Oxide*: | 15.0 |
| Fumed Silica: | 23.0 |
| Structure Control Fluid: | 2.0 |
| Pigment (Black): | 0.6 |
| Benzoyl Peroxide Catalyst: | 0.6 |

*Nodular, pure grade zinc oxide having a high surface area (7 sq. m/gm.).

The structure control fluid may be a low-molecular weight hydroxyl end-stopped polydiorganosiloxane. It is used to prevent crepe-hardening.

In operation, the pad 10 is placed inside a microwave oven of the common domestic variety and heated until it achieves a temperature of 140°–160° F. This may be accomplished by placement in a conventional 700 watt microwave oven for, for example, 15 seconds to 5 minutes, depending on the nature and concentration of the microwave-reactive pad constituent and the mass of the pad. The user then removes the mitt 10 from the microwave oven. The user places the mitt on his hand, which will not be unduly distressed by the hot pad 14 because of the insulated layer 42 or extra fabric layer 54. The user may then go to his or her vehicle and begin wiping the windshield and window surfaces of the vehicle free from accumulated ice or snow. Where a particularly heavy accumulation of snow or ice has been deposited on the car or the like, it may be necessary to reheat the mitt. The user will know when it is time for this to happen when the visual characteristic of the marker 30 changes.

In summary, a novel and useful windshield de-icing and defrosting apparatus has been shown and described, in which a microwave oven is advantageously employed to differentially heat up elastomeric-pad containing apparatus. The heated apparatus may then be applied to windshield glass to remove the snow or ice therefrom.

While the present invention has been described in conjunction with the above detailed description, it is not limited thereto, but only by the scope and spirit of the appended claims.

I claim:

1. Apparatus for removing frozen water from a vehicle windshield or window by hand, comprising:
   a cured microwave-heatable layer including, prior to cure:
      at least one curable polydiorganosiloxane gum having a Williams plasticity in the range of 120 to 170 mm;
      a curing catalyst adaptable to cure said gum; and
      microwave-heatable particulate matter dispersed in said gum, said cured microwave-heatable layer having opposed inner and outer faces, an external surface of said apparatus including said outer face of said cured microwave-heatable layer;
   an insulative fabric layer which is substantially transparent to microwave energy and which is affixed to said inner face of microwave-heatable layer, said insulated layer adapted to be interposed between said inner face and the hand; and
   means for attaching the hand adjacent said insulative layer, said microwave-heatable layer adapted to be heated by microwave energy and then directly applied to a vehicle windshield or window to melt frozen water therefrom.

2. The apparatus of claim 1, wherein said microwave-heatable layer has opposed lateral margins, said means for attaching the hand adjacent the insulative layer including a substantially microwave-nonabsorptive fabric layer connected to said opposed lateral margins of said microwave-heatable layer and extending between said opposed lateral margins to create a cavity for the hand.

3. The apparatus of claim 1, wherein said microwave-heatable layer is mounted on a first fabric layer, said first fabric layer joined to said insulative layer and said means for containing.

4. The apparatus of claim 3, wherein said first fabric layer has opposed lateral margins, said means for containing including a second, substantially microwave-nonabsorptive fabric layer joined to said lateral margins of said first fabric layer to extend between said lateral margins of said first fabric layer and to create a cavity for the hand.

5. Apparatus for removing frozen water from vehicle windshields and windows by hand, comprising:
   a cured, elastomeric microwave-heatable layer having inner and outer faces and including, prior to cure:
      at least one elastomeric gum;
      a curing catalyst adaptable to cure said gum to form a matrix; and
      microwave-heatable particulate matter dispersed in said matrix; and
   means affixed to the microwave-heatable layer for controlling the apparatus by the hand, said means including means for insulating the hand from the microwave-heatable layer, an external surface of said apparatus including said outer surface of said microwave-heatable layer, said external surface adaptable to be directly applied to the vehicle windshield or window.

6. The apparatus of claim 5, wherein said means for controlling is substantially microwave-nonabsorptive.

7. The apparatus of claim 5, and further comprising a marker affixed to said microwave-heatable layer, said marker having a first appearance when said microwave-heatable layer is at a first temperature, said marker having a second appearance readily visually distinguishable from said first appearance when said microwave-heatable layer is at a second temperature lower than said first temperature, said first and second temperatures being such that said marker gives a visual indication that said microwave-heatable layer has cooled to the point that the ability of the microwave-heatable layer to melt frozen water is substantially reduced, said marker reassuming said first appearance when said microwave-heatable larger is reheated to said first temperature.

8. The apparatus of claim 7, wherein said marker comprises a paint applied to said microwave-heatable layer, said paint including a colorant which is at a first color at said first temperature and at a second color readily distinguishable from said first color at said second temperature.

9. The apparatus of claim 8, wherein said first color is clear and said second color is red.

10. The apparatus of claim 8, wherein said elastomeric layer has painted and nonpainted portions, one of said first and second colors being chosen to blend in with the nonpainted portion of the elastomeric layer, the second color being selected to contrast with the nonpainted portion of the elastomeric layer.

11. The apparatus of claim 5, and further comprising a marker affixed to said means for controlling the apparatus by the hand and positioned adjacent said elastomeric layer, said marker having a first appearance when said microwave-heatable layer is at a first temperature, said marker have a second appearance readily visually distinguishable from said first appearance when said microwave-heatable layer is at a second temperature lower than said first temperature, said first and second temperatures being such that said marker gives a visual indication that said microwave-heatable layer has cooled to the point that the ability of the microwave-heatable layer to melt frozen water is substantially reduced, said marker reassuming said first appearance when said microwave-heatable layer is reheated to said first temperature.

12. The apparatus of claim 11, wherein said marker comprises a paint applied to said means for controlling, said paint including a colorant which is at a first color at said first temperature and at a second color readily distinguishable from said first color at said second temperature.

13. The apparatus of claim 11, wherein said first color is clear and said second color is red.

14. Apparatus for removing frozen water from vehicle glass by hand, comprising:
a cured, microwave-heatable elastomeric layer including, prior to cure:
at least one elastomeric gum;
a curing catalyst adaptable to cure said gum to form a matrix; and
microwave-heatable particulate matter dispersed in said matrix,
said microwave-heatable layer having opposed inner and outer faces;
an insulative layer which is substantially transparent to microwave energy and which is affixed to said inner face of said microwave-heatable layer, said insulative layer adapted to be interposed between the microwave-heatable layer and the hand; and
means for containing the hand in a position adjacent the insulative layer, a surface of said apparatus adaptable to be applied to the vehicle glass including said outer face of said microwave-heatable layer.

15. A mitt for removing frozen water from a vehicle windshield or window by hand comprising:
a cured, elastomeric microwave-heatable layer having inner and outer faces and including, prior to cure:
at least one elastomeric gum;
a curing catalyst adaptable to cure said gum to form a matrix; and
microwave-heatable particulate matter disposed in said matrix; and
a fabric body having at least first and second fabric layers, said first and second fabric layers joined to create a cavity for insertion of the hand, said inner face of said elastomeric microwave-heatable layer affixed to said fabric body, an outer surface of said mitt including said outer face of said elastomeric microwave-heatable layer.

16. The mitt of claim 15, and further comprising a third fabric layer joined to one of said first and second fabric layers, said inner surface of elastomeric microwave-heatable layer bonded to said third fabric layer.

17. The mitt of claim 16, wherein an insulative layer is disposed in between said third fabric layer and said one of said first and second fabric layers to be interposed between said microwave-heatable elastomeric layer and the hand.

18. A method for removing frozen water from a vehicle windshield or window by hand, comprising the steps of:
heating a microwave-heatable elastomeric layer in a microwave oven to a predetermined temperature;
removing the heated elastomeric layer from the microwave oven;
insulating the elastomeric layer from the hand by interposing an insulative layer therebetween;
applying the heated elastomeric layer to a surface of the windshield or window having accumulated thereon frozen water; and
in response to said step of applying, melting the frozen water in order to clear the windshield or window.

19. The method of claim 18, and further comprising the steps of:
responsive to said step of heating, causing a visual marker affixed to the microwave-heatable elastomeric layer to have a first visual appearance;
responsive to said step of melting, lowering the temperature of the marker; and
when the temperature has dropped to a second predetermined temperature, causing the visual marker to change from a first visual appearance to a second visual appearance substantially different from the first visual appearance, the marker reverting to the first visual appearance when said elastomeric layer is reheated to said first temperature.

20. The method of claim 19, wherein said step of causing the marker to change from the first visual appearance to the second visual appearance comprises changing a colorant in a paint disposed adjacent the elastomeric layer from a first color to a second color readily distinguishable from the first color.

* * * * *